United States Patent
Pfister

(10) Patent No.: US 6,788,412 B2
(45) Date of Patent: Sep. 7, 2004

(54) PROCESS AND DEVICE FOR THE OPTICAL MARKING OF A TARGET REGION OF A COLOR MEASURING DEVICE ON A MEASUREMENT SURFACE

(75) Inventor: Bruno Pfister, Niederglatt (CH)

(73) Assignee: Gretag-Macbeth AG, Regensdorf (CH)

( * ) Notice: Subject to any disclaimer, the term of this patent is extended or adjusted under 35 U.S.C. 154(b) by 175 days.

(21) Appl. No.: 10/273,067

(22) Filed: Oct. 17, 2002

(65) Prior Publication Data

US 2003/0076498 A1 Apr. 24, 2003

(30) Foreign Application Priority Data

Oct. 19, 2001 (EP) .............................................. 01124322

(51) Int. Cl.⁷ ................................................ G01J 3/46
(52) U.S. Cl. ...................................... 356/402; 356/421
(58) Field of Search ................................ 356/402, 403, 356/407, 421, 448; 250/226

(56) References Cited

U.S. PATENT DOCUMENTS 4,003,660 A * 1/1977 Christie et al. ............. 356/407
5,823,679 A   10/1998 Hollander et al.

FOREIGN PATENT DOCUMENTS

| DE | 4129602 | 3/1992 |
| EP | 0780671 | 6/1997 |
| JP | 04351830 | 12/1992 |
| JP | 07143506 | 6/1995 |
| JP | 11085395 | 3/1999 |

* cited by examiner

Primary Examiner—Frank G. Font
Assistant Examiner—Roy M. Punnoose
(74) Attorney, Agent, or Firm—McCarter & English, LLP

(57) ABSTRACT

A two dimensional color pattern which at each point has a definite and unique color value is reproduced on a measurement surface by way of a computer controlled display device for the optical marking of a target region on the measurement surface captured by a color measuring device. The color measuring device is aimed at the measurement surface and the color value of the target region captured by the color measuring device is measured. The coordinates of the target region on the measurement surface are calculated from the measured color value and an optical marker which visually indicates the location of the target region on the measurement surface is reproduced at that location on the measurement surface as defined by the calculated coordinates of the target region. Alignment of the color measurement device is simplified and made possible without the need for laser pointers or cameras.

7 Claims, 2 Drawing Sheets

PROCESS AND DEVICE FOR THE OPTICAL MARKING OF A TARGET REGION OF A COLOR MEASURING DEVICE ON A MEASUREMENT SURFACE

FIELD OF THE INVENTION

The invention relates to a process and device for the optical marking of a target region captured by a color measuring device on a measurement surface.

BACKGROUND ART

The colorimetric measurement of the image produced on the projection surface by the projection device by way of a color measuring device suited for remote measurement is required for different applications, for example, the generation of color profiles for a processor controlled projection device ("beamer"). The color measuring device must therefor be directed with accurate aim onto the regions to be measured of the measurement surface. This alignment with the measurement region to be measured is today normally carried out by way of special sighting mechanisms, for example, laser pointers, cameras, etc.

SUMMARY OF THE INVENTION

It is now an object of the present invention to provide an alternative possibility for the alignment of a color measurement device which is achieved without such special sighting mechanisms.

This object is achieved in accordance with the invention in that a two dimensional color pattern is reproduced on the measurement surface which at each point has a clearly unique color value, the color measuring device is aligned with the measurement surface, the color value of the target region captured by the color measuring device is measured, the coordinates of the target region are calculated from the measured color value, and an optical marker is reproduced at the location on the measurement surface given by the calculated coordinates of the target region, which marker visualizes the location of the target region on the measurement surface.

BRIEF DESCRIPTION OF THE DRAWINGS

The invention will be further described in the following by way of example only and with reference to the attached drawings, wherein.

DETAILED DESCRIPTION OF THE PREFERRED EMBODIMENTS

Figure 1:
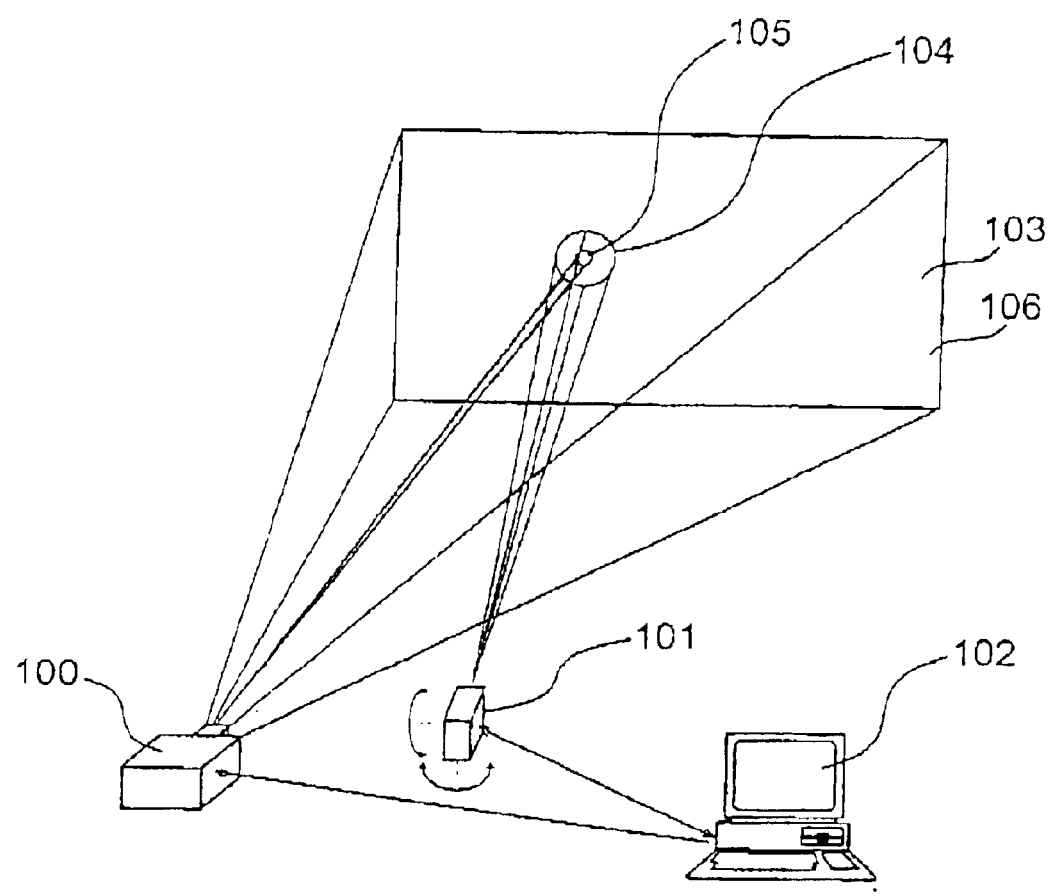
FIG. 1 is a schematic of an exemplary device in accordance with an apparatus and/or process of the present invention.

The device illustrated in FIG. 1 includes a principally conventional color measuring device 101 suitable for remote measurement, a computer 102 and an electronic display arrangement controlled by the computer and in the form of a projection device ("beamer") 100. So far the device corresponds to a classic configuration as used typically for the generation of a color profile for the projection device. The color measuring device 101 thereby captures the target or measurement region 104 on a projection or measurement surface 103 and delivers the color measurement values (for example color coordinates) of the target region to the computer 102 for further processing. The color measuring device 101 is swivelable about two axes so that the target region 104 can be guided over the whole measurement surface 103.

The process in accordance with the invention which will be described more closely in the following serves to optically mark the target region 104 captured by the color measuring device on the measurement surface, so that the user can recognize at which location of the measurement surface 103 the color measuring device 101 is aimed at the moment, so that the color measuring device can be easily and with accurate aim adjusted to the desired measurement location.

According to one aspect of the invention, a special two-dimensional color pattern 106 is herefor produced in the computer 102 and reproduced by way of the projection device 100 on the measurement surface 103. The color pattern 106 is constructed in such a way that it at each location of its two-dimensional extent includes a color which overall appears only once and, thus, is unique. A clear relationship exists therefore between the color of a location and the position of the corresponding location in the color pattern 106. The color pattern 106 preferably has essentially about the same size as the measurement surface 103 covered by the projection device 100.

Figure 2:
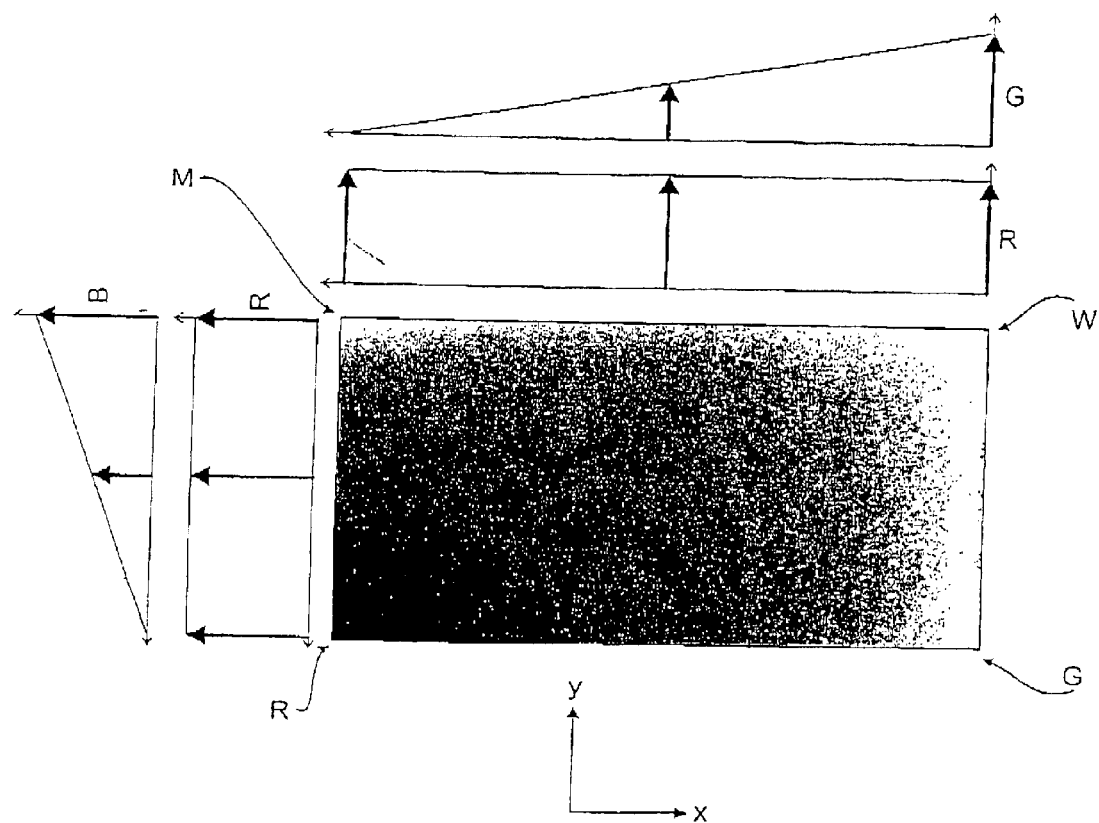
FIG. 2 is an example of a color pattern that may be used in an apparatus and/or process in accordance with the present invention.

FIG. 2 shows a typical color pattern 106 usable for the purposes of the invention. The four boundary edges of the here rectangular color pattern 106 are pair-wise parallel or perpendicular to the axes x and y of a coordinate system. The four corner points R, N, W, and G of the color pattern 106 have the colors red (R), magenta (M), white (W), and yellow (G). Parallel to the y axis, the blue component upwardly linearly increases from 0 (bottom) to a nominal value (top). The green portion linearly increases towards the right in an analogous manner parallel to the x axis from 0 (left) to a nominal value (right). The red portion is constant over the whole color pattern at a nominal value, whereby the nominal values of the three colors red, blue and green are mutually coordinated so that an overlapping of the three nominal values of the three colors results in the color white. Accordingly, the overlapping of red and blue results in the color magenta and the overlapping of red and green in the color yellow.

As is easily apparent, each location of the color pattern 106 thus has a different, unique color. Conversely, a specific (location) coordinate pair which describes the (relative) position of the corresponding location of the color pattern on the color pattern 106 is associated with each uniquely occurring color of the color pattern 106.

The production of the color pattern 106 in the computer 102 can be carried out with practically any color enabled graphic software in a conventional manner. The person skilled in the art does not need any further description in this respect.

It is understood for the purposes of the invention that the progress of the colors in the color pattern 106 does not necessarily need to be continuous (analogous), but can also be discretely graduated in more or less small steps. A minimal discretization is caused anyway by the resolution of the projection device and the color reproduction software running in the computer 102.

The color measuring device 101 is preferably, but not necessarily so, (pre) aligned at the beginning of the process so that the target region 104 (at any location) captured thereby is located within the measurement surface 103. Such a pre or coarse orientation can be generally easily achieved. It is however, as illustrated in the following, not absolutely necessary, when the computer 102 is programmed so that an initial false orientation of the color measurement device 101 (target region outside the projection field covered by the projection device 100, or outside the color pattern 106, when the latter is smaller than the projection field) is recognized and reported. This can be carried out, for example, very simply by logical analysis of the measured color values.

A dark measurement is then first carried out with the color measuring device 101 which means the projection device 100 does not receive a brightness signal from the computer 102 and therefore does not project an image onto the measurement surface 103. The dark measurement values thereby obtained are fed to the computer 102 and stored therein for the generally known dark value correction of the later determined actual measurement values.

Subsequently, the nominal values of the colors yellow (100% red, 100% green, 0% blue) and magenta (100% red, 0% green, 100% blue) are sequentially reproduced (over the whole measurement field) by way of the computer 102 and the projection device 100 and measured by way of the color measuring device. The color measurement values determined thereby deliver, after subtraction of the dark measurement values, the nominal measurement values corresponding to the nominal values of the three colors red, blue and green.

Since the computer knows which color is being reproduced at the moment and, thus, which measurement values it can expect from the color measuring device, it can easily determine whether or not the color measuring device is aligned with the measurement surface and can signal that to the user, preferably in a suitable manner, so that the latter can correct the coarse orientation of the color measuring device, if necessary. The dark measurement and the reproduction of the two colors yellow and magenta is then repeated until the color measuring device is fittingly aligned and the three base colors red, blue and green were clearly identified.

The color pattern is then reproduced on the measurement surface and measured by the color measuring device 101 at the location given by the actual target region 104. The color values determined thereby include depending on the position of the target region 104, red, green and blue portions of different size. From the portions (in percent of the respective nominal measurement values) of the three colors red, green and blue, the (relative and standardized for the dimensions of the color pattern) coordinates x and y (of the center point) of the target region 104 are then calculated in the computer 102 according to the following formulas:

$X$=ratio of green portion/red portion $Y$=ratio of blue portion/red portion

Strictly speaking, the color measuring device 101 does not measure the color of a point, but, because of the finite size of its target region (capturing region) 104, only the mean of the color over the target region. However, this is not a significant factor when the color pattern 106 is suitably constructed, for example as described above. The measurement location is defined as the center point (lying in the optical axis of the color measuring device) of the target region.

In the next step of the process in accordance with the invention, an optical marking 105 is produced by the computer 102 and blended into the color pattern 106 by way of the previously determined coordinates x and y in such a way that it is reproduced on the measurement surface exactly centered on the center point of the target region 104 of the color measuring device 101. This optical marking 105 can be, for example, in the form of a small black circle or cross-hairs. Appearance and location of the marking 105 are again controlled in a generally known manner by the graphic software running on the computer 102.

By way of the optical marking 105 produced in this way, the user can visually recognize at which location on the measurement surface 103 the color measuring device 102 is aimed. When the alignment of the color measuring device 101 is changed, the new target region is again identified by a freshly calculated new optical marking reproduced on the measurement surface. The user can thereby very easily and with great accuracy align the color measuring device 101 with the desired measurement location on the measurement surface 103 for the later use of the whole configuration.

The invention is in no way limited to color patterns of the type described by way of example in FIG. 2. Color patterns without gradients can be used as long as simply a unique association between coordinates and colors is guaranteed.

Furthermore, the invention is also not limited to projection devices ("beamers"). It can also be used in connection with other large surface, electronically controllable display devices, for example, large light emitting diode display boards, large screen displays, etc. In those cases, the measurement surface is the display surface of the display boards or the screens.

With the process and apparatus in accordance with the invention, easy alignment of the color measuring device with accurate aim is possible without auxiliary means, for example laser pointers or cameras and the like.

It will be appreciated by those skilled in the art that the present invention can be embodied in other specific forms without departing from the spirit or essential characteristics thereof. The presently disclosed embodiments are therefore considered in all respects to be illustrative and not restrictive of the scope of the present invention. The scope of the presently claimed invention is indicated by the appended claims, rather than the foregoing description and all changes that come within the meaning and range of equivalents thereof are intended to be embraced therein.

What is claimed is:

1. Process for optical marking of a target region captured by a color measuring device on a measurement surface, comprising:

reproducing on the measurement surface a two-dimensional color pattern which at each point has a unique color value;

aiming the color measuring device onto the measurement surface;

measuring the color value of the target region captured by the color measuring device;

calculating the local coordinates of the target region on the measurement surface from the measured color value; and reproducing an optical marker at the location on the measurement surface defined by the calculated coordinates of the target region, which marker visually identifies the location of the target region on the measurement surface.

2. Process according to claim 1, wherein the color pattern is produced by a computer and reproduced on a measurement surface by a display device controlled by the computer.

3. Process according to claim 2, wherein the display device is a projection device.

4. Process according to claim 2, wherein the color measuring device is connected to the computer and the calculation of the coordinates of the target region is carried out by the computer on the basis of the color value measured by the color measuring device.

5. Process according to claim 4, wherein a shape and location of the optical marker is determined by the computer and the marker is reproduced on the measurement surface by the display device controlled by the computer.

6. Apparatus for optical marking of a color measurement device target region on a measurement surface, comprising:

a color measuring device for measuring a color value of the target region on the measurement surface;

a display device for reproducing a color pattern on the measurement surface, and a computer for controlling the display device for reproducing a two-dimensional color pattern on the measurement surface, the two-dimensional color pattern at each location having a unique color value, and for calculating from the color value of the target region as measured by the color measuring device and the structure of the color pattern the coordinates (x, y) of the target region on the measurement surface, the computer being further constructed for calculating an optical marker on the basis of the calculated coordinates and to reproduce the optical marker on the measurement surface by way of the display device and at the location of the target region.

7. Apparatus according to claim 6, wherein the display device is an electronically controllable projection device.

* * * * *